United States Patent [19]

Allen et al.

[11] Patent Number: 4,731,670
[45] Date of Patent: Mar. 15, 1988

[54] IMAGING APPARATUS

[75] Inventors: James D. Allen; Joel L. Seligson, both of Rochester, N.Y.

[73] Assignee: Eastman Kodak Company, Rochester, N.Y.

[21] Appl. No.: 79,383

[22] Filed: Jul. 30, 1987

[51] Int. Cl.⁴ .............................................. H04N 1/10
[52] U.S. Cl. .................... 358/298; 358/293; 350/96.13
[58] Field of Search ............ 358/298, 296, 293, 300, 358/302; 346/107 R, 108; 350/96.13

[56] References Cited

U.S. PATENT DOCUMENTS

| | | | |
|---|---|---|---|
| 3,320,617 | 5/1967 | Hawkins et al. | 346/108 |
| 4,162,118 | 7/1979 | Conwell | 350/96.13 |
| 4,356,730 | 11/1982 | Cade | 73/517 R |
| 4,378,568 | 3/1983 | Mir | 358/296 |
| 4,454,547 | 6/1984 | Yip et al. | 358/302 |

FOREIGN PATENT DOCUMENTS 56-164307  12/1981  Japan ........................ 350/96.13

*Primary Examiner*—Clifford C. Shaw
*Attorney, Agent, or Firm*—Donald D. Schaper

[57] ABSTRACT

Imaging apparatus is disclosed for exposing a recording medium to produce an image in accordance with information contained in an electrical signal. The apparatus comprises a light source, optical means for imaging light onto the recording medium, and a light-valve array to control the light reaching selected areas of the recording medium. The light valve-array is comprised of a plurality of electrostatically deflectable elements each of which contains a waveguide for transmitting light from the source to a receptor waveguide. Light from the receptor waveguides is imaged onto the recording medium. In order to provide for gray scale in the image, a control means is provided to precisely control the amount of deflection of the elements and thereby control the amount of light transmitted for a given pixel.

5 Claims, 11 Drawing Figures

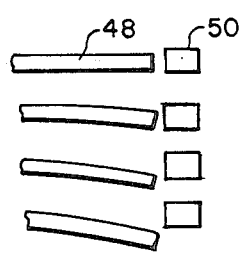
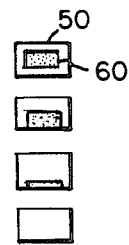
FIG. 8   FIG. 9
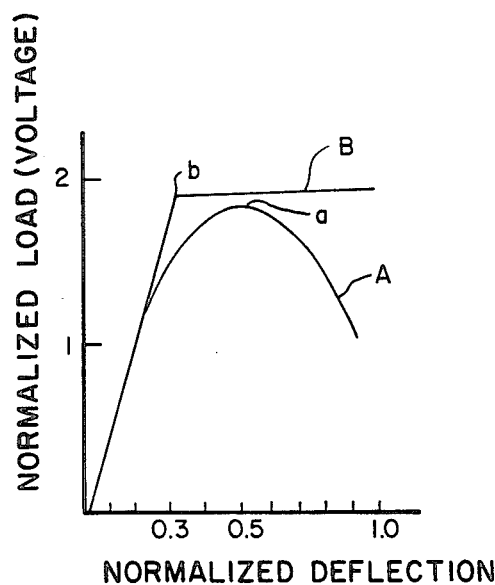
FIG. 10

IMAGING APPARATUS

CROSS REFERENCE TO RELATED APPLICATIONS

Reference is made to U.S. patent application, Ser. No. 079,382, entitled Imaging Apparatus, filed in the name of J. L. Seligson, on even date herewith.

BACKGROUND OF THE INVENTION

1. Field of the Invention

The present invention relates to imaging apparatus, and more particularly to such apparatus in which a light-valve array is used to produce a continuous-tone image on a recording medium.

2. State of the Prior Art

Various types of imaging apparatus are used to effect the exposure of a recording medium in accordance with information in an electrical signal. For example, in U.S. Pat. No. 4,454,547, there is disclosed an output scanner which comprises a source of high intensity radiation, means for converting radiation from the source to a plurality of individual radiation beams, and an array of flexible reflector fingers which can be positioned in response to an information signal to direct the beams onto an imaging member. The fingers are selectively deflected by an electrostatic force resulting from a voltage imposed on the fingers. A problem with the scanner disclosed in this patent is that it is not adapted to produce a continuous-tone image. When the finger is fully deflected, no light is transmitted to the imaging member, and when the finger is not deflected, the full beam is transmitted to the imaging member.

U.S. Pat. No. 4,378,568, discloses apparatus which utilizes a plurality of light valves to produce a continuous tone image. The light valves are arranged in an array which includes a panel of ferroelectric ceramic material having a plurality of electrodes thereon which can be selectively energized. The light valves used in this apparatus are too slow for certain applications, and relatively complex electronics are required to actuate the light valves.

SUMMARY OF THE INVENTION

It is an object of the present invention to overcome the problems in the prior art and to provide imaging apparatus which produces a continuous tone image of high quality.

In accordance with the present invention, there is provided imaging apparatus for exposing a recording medium, the apparatus comprising: a light source; a light-valve array for receiving light from the source, the array comprising a plurality of light valves, each of the light valves including an electrostatically deflectable element having a transmitter waveguide thereon and a stationary element having a receptor waveguide thereon, the deflectable element having an initial position in which a beam of light can be transmitted from the transmitter waveguide to the receptor waveguide and the waveguides are axially aligned, the deflectable element being movable from the initial position through a series of positions in which progressively less light can be transmitted to the receptor waveguide and to a fully-deflected position in which no light can be transmitted, each of the elements being selectively deflectable in response to an information signal; optical means for imaging the beams on the recording medium; and control means connected to the elements for controlling the deflection thereof in accordance with an information signal which contains gray scale information.

In one embodiment of the present invention, light from a source is transmitted through a cylindrical lens to a light-valve array. The light valve-array is controlled by an information signal which selectively deflects elements in the array to modulate each of the light beams, and the amount of deflection determines the gray scale of each pixel. The modulated beams from the light-valve array are passed through waveguides to a series of lenses which serve to focus the beams on the recording medium. The recording medium is movable relative to the lenses.

An advantage of the present invention is that the light valves can be precisely controlled to obtain the desired gray scale in a high throughput operation. A further advantage is that the light-valve array can be contained in a relatively small space, and thus, the imaging apparatus can be made more compact.

Other features and advantages will become apparent with reference to the following Description of the Preferred Embodiments when read in light of the attached drawings.

BRIEF DESCRIPTION OF THE DRAWINGS

FIG. 8 is an schematic illustration showing the positions of an element to produce different gray-scale exposures;

FIG. 9 is a schematic illustration showing the amount of light transmitted to a receptor waveguide for each of the positions of the element shown in FIG. 8;

FIG. 10 is a graph showing the deflection of an element plotted versus load on the element.

DESCRIPTION OF THE PREFERRED EMBODIMENT

Figure 1:
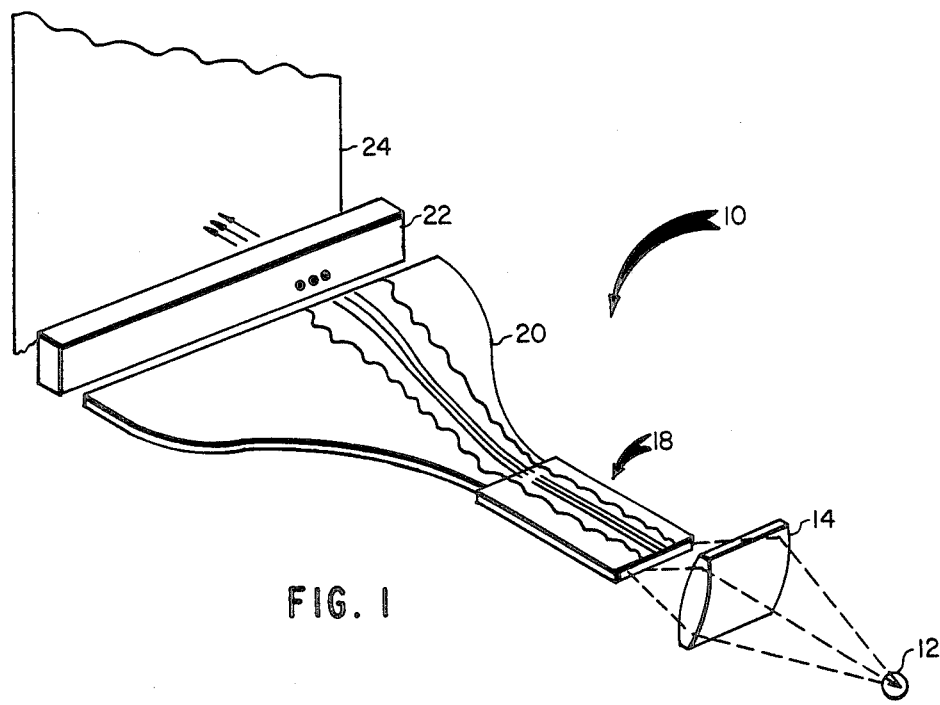
FIG. 1 is a perspective view of the imaging apparatus of the present invention.

With reference to FIG. 1, there is shown imaging apparatus 10 constructed in accordance with the present invention. Imaging apparatus 10 comprises: a light source 12 which can be, for example, an incandescent light; a cylindrical lens 14; a light-valve array 18; a fanned-out array 20 of multimode waveguides; and an array 22 of gradient-index lenses which serve to image the ends of the individual waveguides in array 20 onto a recording medium 24. The lenses in the array 22 can be, for example, lenses sold under the trademark "Selfoc," by Nippon Sheet Glass Co., Ltd.

As used herein, the term "multimode waveguide" refers to a waveguide which is relatively thick and has defined boundaries for the propagation of light therethrough.

Figure 2:
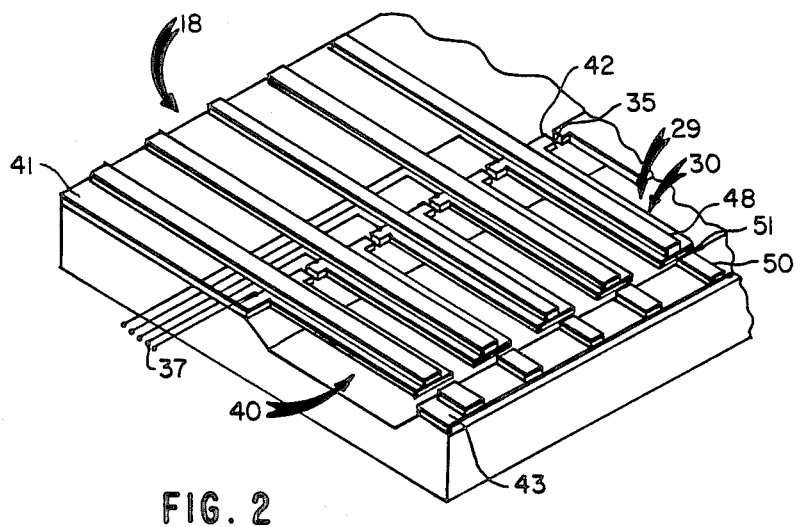
FIG. 2 is a perspective view of the light-valve array of the present invention.
Figure 3:
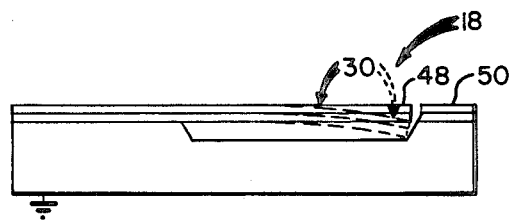
FIG. 3 is a side elevational view of the array shown in FIG. 2, showing one of the elements in an initial position and in a fully-deflected position.

Light-valve array 18, as shown in FIGS. 2 and 3, comprises a plurality of light valves 29 each of which includes an electrostatically deflectable element 30. Elements 30 are supported in cantilever fashion and are electrically isolated from one another by gaps 35. As will be explained in more detail hereinafter, a voltage can be applied to a selected element 30 through a lead 37 to effect a deflection of the element 30, the fully-deflected position being shown in dotted lines in FIG. 3.

Figure 4:
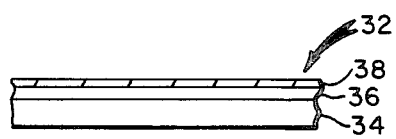
FIGS. 4-7 are sectional views showing the formation of the light-valve array.

The formation of light valves 29 is shown in FIGS. 4–7. As shown in FIG. 4, a body 32 of semiconductor material, such as silicon, includes a p-type substrate 34 having an epitaxial layer 36 formed thereon and a highly-doped p+ type region (not shown) disposed between the epitaxial layer 36 and the substrate 34. A silicon dioxide layer 38, which serves as both an electrically-insulating material and an optically-insulating material, is formed on layer 36.

Figure 5:
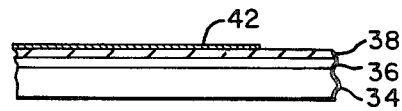
Figure 6:
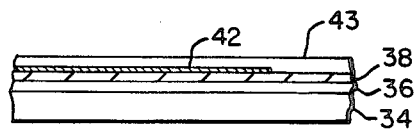

A plurality of metal electrodes 42 are formed on the silicon dioxide layer 38, as shown in FIGS. 2 and 5. The metal of electrodes 42 can be, for example, gold or chromium. After the electrodes 42 have been formed, a layer of waveguide material 43 is deposited over electrodes 42 and over the exposed portions of silicon dioxide layer 38, as shown in FIG. 6. The waveguide material is then patterned, using known photolithographic methods and ion beam or reactive ion beam etching; in this step, a transmitter waveguide 48 and a receptor waveguide 50 are formed as shown in FIG. 2. The gap 51 between waveguides 48 and 50 is generally equal to the thickness of the waveguides 48, 50. Waveguides 48 and 50 can be formed from PMMA (poly (methyl methacrylate)) or other patternable transparent material having a refractive index sufficiently higher than that of silicon dioxide to facilitate transmission of light through the waveguides 48 and 50. Silicon dioxide has a refractive index of 1.46, and PMMA has a refractive index of 1.49.

Figure 7:
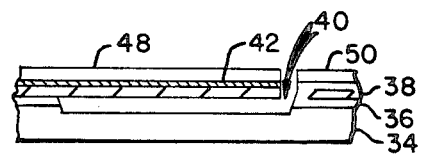

In a final step, an etchant is applied to the silicon dioxide layer 38 to define the outlines of elements 30, and another etchant is applied to form a well 40 in the body 32 under the silicon dioxide layer 38. The well 40 separates the body 32 into a section 41 which is positioned adjacent lens 14 in apparatus 10 and a section 45 which is positioned adjacent array 20. As shown in FIGS. 2 and 7, elements 30 extend over well 40 and function in the manner of a cantilever beam.

Each of the elements 30 responds to the imposition of a voltage between its electrode 42 and the p+ region between substrate 34 and expitaxial layer 36, the resulting electrostatic force causing the element 30 to bend or deflect downwardly from an initial position (shown in solid lines in FIG. 3) to a fully deflected position (shown in dotted lines in FIG. 3). When no voltage is applied to electrode 42, it being assumed that the effects of material stress and gravity are negligible, element 30 is not deflected. When a voltage is applied, element 30 deflects in proportion to the amount of voltage applied until the voltage reaches a critical level which is referred to as the threshold voltage. At the threshold voltage, the element 30 becomes unstable, and the element 30 deflects until it touches the bottom of well 40 (FIG. 3).

If the voltage to element 30 is cut off at anytime before the threshold voltage is reached, element 30 will return to its initial position. However, after the voltage exceeds the threshold level and element 30 has snapped into a fully-deflected position, element 30 can be maintained in its deflected position with a voltage less than threshold. Before the element 30 will return to its initial position, after having been put into a fully-deflected position, the applied voltage must fall below a minimum holding voltage which is nearly zero volts. With reference to FIGS. 2, 3, and 7, it will be apparent that when no voltage is applied to element 30, light applied to a transmitter waveguide 48 will be transmitted to a receptor waveguide 50 and will ultimately be imaged onto recording medium 24; and when a threshold voltage is applied to the electrode 42 of an element 30, the element 30 will be deflected to a position in which no light will be transmitted from waveguide 48 to waveguide 50.

As noted above, when a voltage is supplied to an elements 30, the deflection of the element is proportional to the voltage for voltage values up to the threshold voltage. A more complete discussion of the characteristics of elements 30 can be found in an article entitled "Dynamic Micromechanics on Silicon: Techniques and Devices," from the IEEE Trans. Elec. Devices, ED-25, #10, October 1975, on page 1241. As discussed in this article, the electrostatic forces become increasingly concentrated at the tip of an element 30, as the element bends downward. At a particular voltage, this concentrated load causes the element 30 to become unstable and it undergoes a spontaneous deflection to the fully-deflected position. This is illustrated in FIG. 10 which shows plots of normalized deflection versus normalized load (voltage) for values calculated using methods disclosed in the IEEE article (Curve A) and for empirical data (Curve B). The threshold voltage is indicated at points a and b in curves A and B respectively.

In creating a continuous tone image, voltages are supplied in accordance with desired gray scale in the range between zero volts and the threshold voltage. Four positions which the elements 30 can take in this range are shown in FIG. 8, and the amount of light transmitted in each of these positions is indicated schematically in FIG. 9, the dark area 60 being used to indicate generally the size of the light beam. Thus, it will be apparent that, as the element 30 is deflected toward the bottom of the well 40, progressively less light is transmitted until no light is transmitted when the element 30 is touching the well 40. Although elements 50 are represented in FIG. 9 as being generally rectangular in cross section, it may be desirable to use other shapes for certain applications. For example, the elements could be made narrower at the top than the bottom, as viewed in FIG. 9, to obtain a more nearly linear correspondance between the amount of movement of elements 30 and amount of light transmitted from waveguide 48 to waveguide 50.

Figure 11:
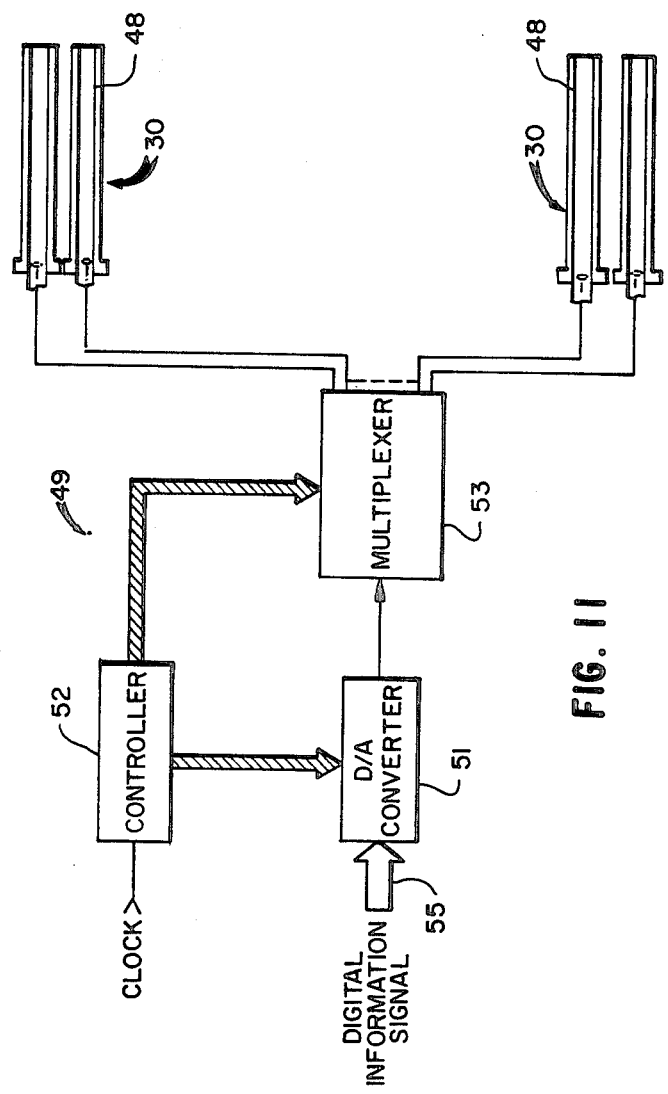
FIG. 11 is schematic diagram of the control for the elements.

In order to perform line printing with apparatus 10, a digital information signal 55 (FIG. 11) is applied to a control module 49. The information signal 55, which represents the gray scale for successive picture elements in an image, can be supplied from any suitable source (not shown) such as an input scanner, a communication channel, or a memory device. Control module 49 comprises a digital-to-analog converter 51 which supplies a series of analog voltage signals to multiplexer 53 in response to control signals from a controller 52. Multiplexer 53 responds to further control signals from the controller 52 to deliver the voltage signals to successive electrodes 42 of elements 30 at a rate which is matched to the data rate of signal 55.

It is important in the functioning of apparatus 10 that elements 30 have a high frequency response. In Table I, computed resonant frequencies and threshold voltages are shown for elements 30 of three different sizes. The first resonant frequency ($f_R$) for transverse (or bending)

oscillations of a uniform beam is given by the equation:

$$f_R = \frac{3.52}{2\pi} \sqrt{\frac{EI}{\mu l^4}}$$

where
E is Young's modulus;
I is the moment of inertia;
$\mu$ is the weight per unit length of element 30;
l is the length of element 30.

In using the above formula to compute the resonant frequency of element 30, the effective EI product for a multilayer beam, such as element 30, can be calculated using well-known techniques. In each of the elements 30 in Table I, the etched depth of well 40 is generally equal to the thickness of waveguide 48, the thickness of the silicon dioxide layer 38 is one micrometer, and the metal electrode 42 is formed from chromium at a thickness of 50 nm.

TABLE I

| Waveguide Thickness ($\mu$m) | Element Length (mm) | Resonant Frequency (khz) | Threshold Voltage (V) |
|---|---|---|---|
| 10 | 1.0 | 10 | 20 |
| 26 | 1.6 | 10 | 100 |
| 38 | 6.3 | 1 | 20 |

The invention has been described in detail with particular reference to a preferred embodiment thereof, but it will be understood that variations and modifications can be effected within the spirit and scope of the invention.

What is claimed is:

1. Imaging apparatus for exposing a recording medium, said apparatus comprising:
   a light source;
   a light-valve array for receiving light from said source, said array comprising a plurality of light valves, each of said light valves including an electrostatically deflectable element having a transmitter waveguide thereon and a stationary element having a receptor waveguide thereon, said deflectable element having an initial position in which a beam of light can be transmitted from said transmitter waveguide to said receptor waveguide and said waveguides are axially aligned, said deflectable element being movable from the initial position through a series of positions in which progressively less light can be transmitted to the receptor waveguide and to a fully-deflected position in which no light can be transmitted, each of said elements being selectively deflectable in response to an information signal;
   optical means for receiving beams from said elements and for imaging said beams on said recording medium; and
   control means connected to said elements for controlling the deflection thereof in accordance with an information signal which contains gray-scale information.

2. Imaging apparatus, as defined in claim 1, wherein said optical means comprises an array of multimode waveguides, and said array of multimode waveguides including a waveguide opposite each of said receptor waveguides.

3. Imaging apparatus, as defined in claim 2, wherein said optical means includes a lens array for transmitting individual light beams from said array of multimode waveguides to said receiving medium.

4. Imaging apparatus, as defined in claim 1, wherein said apparatus includes a cylindrical lens for imaging said light source on said light-valve array.

5. Imaging apparatus for exposing a recording medium, said apparatus comprising a light source, a light-valve array for receiving light from said source, said array having a plurality of individually actuatable light valves, optical means for receiving beams from said valves and for imaging said beams on said recording medium characterized in that each of said valves includes an electrostatically deflectable element having a transmitter waveguide thereon and a stationary receptor waveguides arranged opposite said transmitter waveguide, said element having an initial position in which said transmitter waveguide and said receptor waveguide are axially aligned for transmitting a beam of light, said element being movable from said initial position through a series of positions in which progressively less light is transmitted to said receptor waveguide and to a fully-deflected position in which no light is transmitted, said element being selectively deflectable in response to an information signal which contains gray scale information.

* * * * *